US010592470B2

(12) United States Patent
Nichols

(10) Patent No.: US 10,592,470 B2
(45) Date of Patent: Mar. 17, 2020

(54) DISCOVERY OF CALLING APPLICATION FOR CONTROL OF FILE HYDRATION BEHAVIOR

(71) Applicant: MICROSOFT TECHNOLOGY LICENSING, LLC, Redmond, WA (US)

(72) Inventor: Jack Allen Nichols, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 15/367,297

(22) Filed: Dec. 2, 2016

(65) Prior Publication Data

US 2018/0046635 A1   Feb. 15, 2018

Related U.S. Application Data

(60) Provisional application No. 62/372,845, filed on Aug. 10, 2016.

(51) Int. Cl.
  *G06F 16/11* (2019.01)
  *G06F 16/182* (2019.01)
  *G06F 21/62* (2013.01)

(52) U.S. Cl.
  CPC .......... *G06F 16/122* (2019.01); *G06F 16/182* (2019.01); *G06F 21/6218* (2013.01); *G06F 2221/2125* (2013.01); *G06F 2221/2141* (2013.01)

(58) Field of Classification Search
  CPC ......... G06F 17/30082; G06F 17/30194; G06F 21/6218; G06F 2221/2125; G06F 2221/2141; G06F 16/122; G06F 16/182

USPC ........................................................ 707/827
  See application file for complete search history.

(56) References Cited

U.S. PATENT DOCUMENTS

| | | |
|---|---|---|
| 7,698,744 B2 | 4/2010 | Fanton et al. |
| 7,779,034 B2 | 8/2010 | Pedersen et al. |
| 7,962,950 B2 | 6/2011 | Choo et al. |
| 8,331,566 B1 | 12/2012 | Foote et al. |
| 8,392,832 B2 | 3/2013 | Arastafar |

(Continued)

FOREIGN PATENT DOCUMENTS

| | | |
|---|---|---|
| WO | 2013126615 A1 | 8/2013 |
| WO | 2016033203 A1 | 3/2016 |

OTHER PUBLICATIONS

"Sync infinite cloud storage", Retrieved on: Jul. 29, 2016, Available at: https://www.odrive.com/features/sync.

(Continued)

*Primary Examiner* — Phuong Thao Cao
(74) *Attorney, Agent, or Firm* — Michael Best & Friedrich LLP

(57) ABSTRACT

Variety of approaches to control file hydration behavior are described. A filter driver initiates operations to control file hydration behavior upon receiving a process identifier (PID) registration from a synchronization engine. Upon receiving a file operation request associated with a placeholder file, a PID and a process name associated with the file operation is identified. A hydration behavior is detected based on the PID or the process name. A decision associated with the file operation request is rendered based on the hydration behavior.

16 Claims, 7 Drawing Sheets

(56) References Cited

U.S. PATENT DOCUMENTS

| | | | |
|---|---|---|---|
| 8,458,127 B1* | 6/2013 | Lorch, III | G06F 17/30174 |
| | | | 707/617 |
| 8,505,057 B2* | 8/2013 | Rogers | H04N 21/2225 |
| | | | 709/217 |
| 8,627,205 B2* | 1/2014 | Worthington | G06F 9/451 |
| | | | 715/716 |
| 8,630,987 B2* | 1/2014 | Dhuse | H04N 7/17336 |
| | | | 707/697 |
| 8,751,604 B2 | 6/2014 | Liebman | |
| 8,832,296 B2* | 9/2014 | Yandek | G06F 8/65 |
| | | | 709/231 |
| 8,856,803 B2 | 10/2014 | Guddanti et al. | |
| 9,020,994 B1* | 4/2015 | Hilliar | G06F 12/12 |
| | | | 707/827 |
| 9,166,866 B2* | 10/2015 | Novak | H04L 29/0854 |
| 9,218,350 B2 | 12/2015 | Novak et al. | |
| 9,235,587 B2* | 1/2016 | Hahn | G06F 16/1734 |
| 9,361,297 B2 | 6/2016 | Cameron et al. | |
| 9,361,349 B1 | 6/2016 | Newhouse | |
| 9,619,482 B1* | 4/2017 | Kothari | H04L 67/06 |
| 2004/0019613 A1 | 1/2004 | Jones et al. | |
| 2006/0015718 A1 | 1/2006 | Liu et al. | |
| 2007/0150448 A1 | 6/2007 | Patnode | |
| 2007/0179990 A1* | 8/2007 | Zimran | G06F 16/125 |
| 2008/0014917 A1* | 1/2008 | Rhoads | G06F 3/017 |
| | | | 455/422.1 |
| 2008/0133714 A1 | 6/2008 | Gautier et al. | |
| 2009/0100060 A1* | 4/2009 | Livnat | G06F 21/10 |
| 2010/0107047 A1* | 4/2010 | Amsterdam | G06F 17/30887 |
| | | | 715/208 |
| 2010/0107091 A1* | 4/2010 | Amsterdam | G06F 17/3089 |
| | | | 715/760 |
| 2011/0016122 A1* | 1/2011 | Motwani | G06F 16/182 |
| | | | 707/736 |
| 2011/0173251 A1* | 7/2011 | Sandhu | G06F 8/61 |
| | | | 709/203 |
| 2012/0189279 A1* | 7/2012 | Kiyama | G11B 20/00086 |
| | | | 386/248 |
| 2013/0047165 A1* | 2/2013 | Goetz | G06F 9/5027 |
| | | | 718/105 |
| 2013/0198831 A1* | 8/2013 | Jump | G06F 9/4843 |
| | | | 726/16 |
| 2013/0290388 A1* | 10/2013 | Lenox | G06F 3/0611 |
| | | | 707/827 |
| 2014/0324776 A1* | 10/2014 | Novak | G06F 17/30153 |
| | | | 707/624 |
| 2014/0324777 A1* | 10/2014 | Novak | G06F 16/178 |
| | | | 707/624 |
| 2014/0324945 A1* | 10/2014 | Novak | H04L 29/0854 |
| | | | 709/203 |
| 2014/0330874 A1* | 11/2014 | Novak | H04L 65/4069 |
| | | | 707/827 |
| 2014/0344336 A1 | 11/2014 | Lopez et al. | |
| 2014/0351301 A1* | 11/2014 | Yandek | G06F 8/65 |
| | | | 707/827 |
| 2014/0358860 A1* | 12/2014 | Wautier | G06F 16/27 |
| | | | 707/638 |
| 2015/0052539 A1* | 2/2015 | Yamamoto | H04L 67/1095 |
| | | | 719/320 |
| 2015/0088831 A1* | 3/2015 | Hamborg | G06F 11/1464 |
| | | | 707/652 |
| 2015/0120655 A1* | 4/2015 | Chi | H04L 67/1095 |
| | | | 707/613 |
| 2015/0277825 A1* | 10/2015 | Isobe | G06F 3/1243 |
| | | | 358/1.18 |
| 2015/0288695 A1 | 10/2015 | Ansari et al. | |
| 2016/0026367 A1* | 1/2016 | Brown | G06F 3/04817 |
| | | | 715/835 |
| 2016/0132522 A1* | 5/2016 | Lee | G06F 17/30132 |
| | | | 707/827 |
| 2017/0068682 A1* | 3/2017 | Crews | G06F 17/30011 |
| 2017/0149885 A1* | 5/2017 | Kaplan | H04L 67/1095 |
| 2018/0039652 A1* | 2/2018 | Nichols | G06F 17/3007 |
| 2018/0060350 A1* | 3/2018 | Christiansen | G06F 3/0611 |
| 2018/0084044 A1* | 3/2018 | Nichols | H04L 67/1095 |
| 2018/0102902 A1* | 4/2018 | Yang | G06F 21/602 |

OTHER PUBLICATIONS

"Kernel Authorization", In Technical Note TN2127, Retrieved on: Jul. 29, 2016, 15 pages.

"International Search Report and Written Opinion Issued in PCT Application No. PCT/US2017/045204", dated Dec. 5, 2017, 11 Pages.

Shan, et al., "An Overlay File System for Cloud-Assisted Mobile Applications", In Proceedings of 32nd Symposium on Mass Storage Systems and Technologies, May 2, 2016, 14 Pages.

Sheehan, Genevieve, "A Revolutionary New Way to Access all your Files", Retrieved From: https://web.archive.org/web/20160427120255/https://blogs.dropbox.comibusiness/2016/04/announcing-project-infinite/, Apr. 26, 2016, 2 Pages.

Deville, Damien, "Going Deeper with Project Infinite", Retrieved From: https://web.archive.org/web/20160525015532/https://blogs.dropbox.com/tech/2016/05/going-deeper-with-project-infinite/, May 24, 2016, 4 Pages.

\* cited by examiner

DISCOVERY OF CALLING APPLICATION FOR CONTROL OF FILE HYDRATION BEHAVIOR

CROSS-REFERENCE TO RELATED APPLICATIONS

This Application claims the benefit under 35 U.S.C. § 119(e) of U.S. Provisional Patent Application Ser. No. 62/372,845 filed on Aug. 10, 2016. The disclosure of the U.S. Provisional Patent Application is hereby incorporated by reference in its entirety.

BACKGROUND

Information exchange through a variety of communication modalities has changed processes associated with work and personal environments. Automation and process enhancements have expanded scope of capabilities offered for information consumption in personal and business scenarios. With the development of faster and smaller electronics, execution of mass processes at cloud systems have become feasible. Indeed, applications provided by data centers, data warehouses, data workstations have become common features in modern personal and work environments. Such systems execute a wide variety of applications ranging from enterprise resource management applications to storage tools. Many such applications manage file storage. Cloud based file management consume significant resources and performance at a promise of improved user productivity.

Improved cloud based file management techniques are becoming ever more important as communication complexity increases across the computer industry. Variety of techniques are necessary to generate a placeholder file, maintain the placeholder file, and replace the placeholder file with an actual file in response to a variety of interactions by systems and users. There are currently significant gaps when attempting to access file system data associated with a placeholder file. Lack of relevant storage management methods lead to poor management of file resources when managing a placeholder file.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to discovery of a calling application for control of file hydration behavior. A filter driver, according to embodiments, may initiate operations to control file hydration behavior upon receiving a process identifier (PID) registration from a synchronisation engine. Upon receiving a file operation request associated with a placeholder file, a PID and a process name associated with the file operation request may be identified. A hydration behavior may be detected based on the PID or the process name. A decision associated with the file operation request may be rendered based on the hydration behavior.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
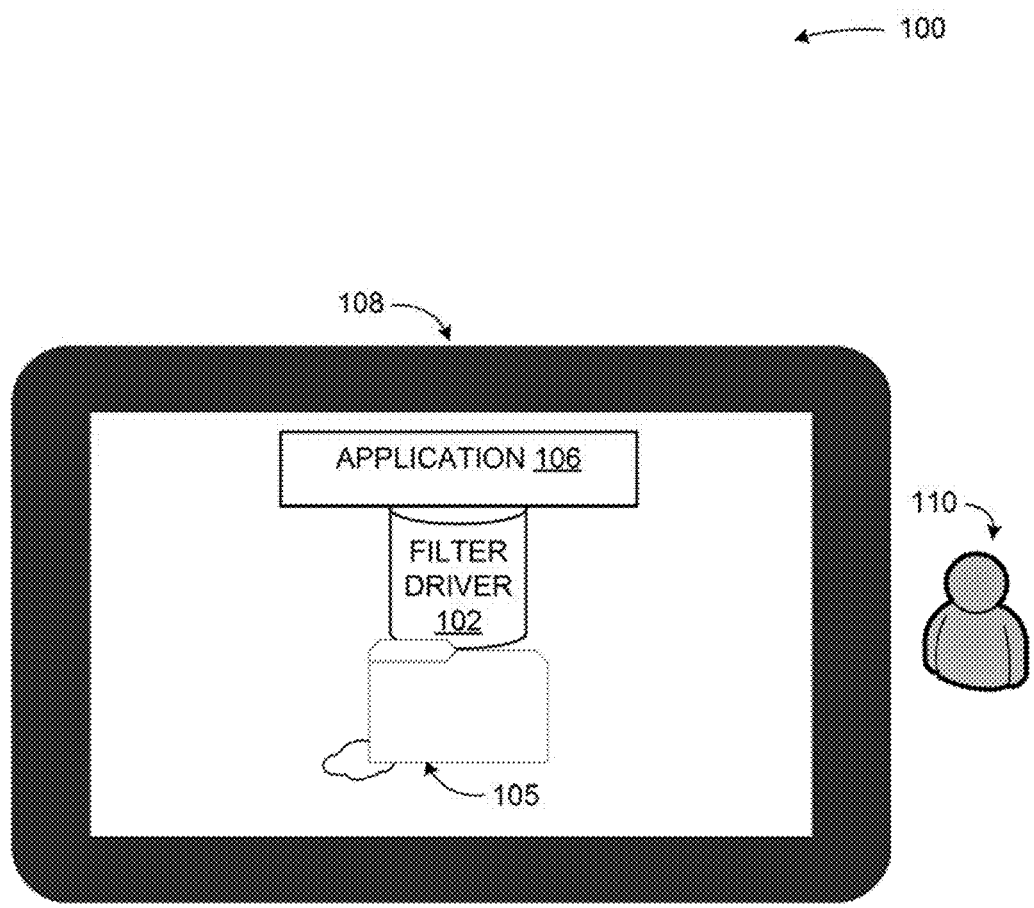
FIG. 1 is a conceptual diagram illustrating examples of controlling file hydration behavior, according to embodiments.

As briefly described above, a filter driver may discover a calling application to control file hydration behavior. In an example scenario, the filter driver may initiate operations to control file hydration upon receiving a process identifier (PID) registration from a synchronization engine. The synchronization engine may act as an intermediary between the filter driver and a file system to replace a placeholder file with file system data. The placeholder file may include an empty file or a representation of an actual file. For example, a thumbnail of an image may serve as a placeholder file for the image. In response to a file operation request for the thumbnail, file system data associated with the image may be accessed to replace the placeholder file with the file system data. As such, the image may be provided in response to an access of the thumbnail.

The filter driver may receive a file operation request associated with a placeholder file. The placeholder file may be a file access scheme commonly used by a cloud based provider. The cloud based provider may present the placeholder file instead of an actual file to save resources needed to store and manage multiple copies of an actual file. Next, a PID and a process name associated with the file operation request may be identified. The PID and the process name may be associated with an application that initiates the file operation request.

The filter driver may detect a hydration behavior based on the PID or the process name. The PID may be matched to the PID registration to verify file hydration behavior entitled to the application through an intermediary such as the synchronization engine. Next, a decision associated with the file operation may be rendered based on the hydration behavior. The hydration behavior associated with the application may include an allow scheme, an early hydration scheme, and/or a deny scheme, among others.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to control file hydration behavior. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display, a non-visual display (for impaired users as an example), and/or other user experience associated with an application or service through which a user interacts with the application or service. A user action refers to an interaction between a user and a user experience of an application or a user experience provided by a service that includes touch input, gesture input, voice command, eye tracking, gyroscopic input, pen input, mouse input, and/or keyboards input, among others. An application programming interface (API) may be a set of routines, protocols, and tools for an application or service that enable the application or service to interact or communicate with one or more other applications and services managed by separate entities.

FIG. 1 is a conceptual diagram illustrating examples of controlling file hydration behavior, according to embodiments.

In a diagram 100, a computing device 108 may execute a filter driver 102. The filter driver 102 may include an input/output (I/O) evaluator for analyzer, processor, and/or scrubber, among others) that is installed locally and executed at a kernel level. An example of the computing device 108 may include a mobile computing device such as a smart phone, a tablet, and/or a mobile computer. The computing device 108 may also include stationary device such as a desktop computer, and/or a workstation computer, among others.

Alternatively, an example of the computing device 108 may include a physical server providing service(s) and/or application(s) to client devices. A service may include an application performing operations in relation to a client application and/or a subscriber, among others. An example of the physical server may include and/or is part of a workstation computer, a data warehouse, a data center, and/or a cloud based distributed computing source, among others.

The computing device 108 may execute the filter driver 102. The filter driver 102 may receive a process identifier (PID) registration from synchronization engine. The synchronization engine may act as an intermediary between the filter driver and a file system to replace a placeholder file 105 with file system data. The file system data may include contents of the actual file represented by the placeholder file 105. The file system data may also include the actual file. The placeholder file 105 may include an empty file or a representation of an actual file. For example, the empty file may include no thumb data. Furthermore, a thumbnail of an image may serve as a placeholder file 105 for the image. The placeholder file 105 may also include metadata that points to the actual file. In response to a file operation request for the thumbnail, file system data associated with the image may be accessed to replace the placeholder file 105 with the file system data. As such, the image may be provided in response to an access operation of the thumbnail.

The filter driver 102 may receive a file operation request associated with a placeholder file 105. The placeholder file may include a file access scheme commonly used by a cloud based provider. The cloud based provider may present the placeholder file 105 instead of an actual file to save resources needed to store and manage multiple copses of an actual file. The placeholder file 105 may be recognized based on a property. The property may include a file size (such as an empty file, a small file), and/or a file content (such as a pointer to an actual file), among others. Next, a PID and a process name associated with the file operation request may be identified. The PID and the process name may be associated with an application 106 that initiates the file operation request. An operating system may be queried to identify the PID and/or the process name associated with the file operation request. Credentials associated with the application 106 may be used to query the operating system for the PID and/or the process name.

A user 110 may prompt the application 106 to initiate the file operation request by demanding an access to an actual file referred by the placeholder file 105. The user 110 may interact with the application 106 through the computing device 108 which may execute the application 106 and/or a user interface of the application 106.

The filter driver 102 may detect a hydration behavior based on the PID or the process name. The PID may be matched to the PID registration to verify file hydration behavior entitled by the application through an intermediary such as the synchronization engine. The PID may also be used to retrieve a binary name or other metadata about the application 106 to identify the application 106 and search for the file hydration behavior associated with the application 106. For example, the PID associated with the application 106 (and/or the file operation request) may be matched to the PID registration associated with a synchronization engine that services the application 106. An example may include a PID associated with an image viewer (as the application 106) matched to a synchronization engine that services image type files. Next, a decision associated with the file operation may be rendered based on the hydration behavior. The hydration behavior associated with the application 106 may include an allow scheme, an early hydration scheme, and/or a deny scheme, among others.

The computing device 108 may communicate with other device(s) through a network. The network may provide wired or wireless communications between network nodes such as the computing device 108 and/or the other device(s), among others. Previous example(s) to control life hydration behavior are not provided in a limiting sense. Alternatively, the filter driver 102 may control file hydration behavior as part of and/or in collaboration with a desktop application, a workstation application, and/or a server application, among others. The application 106 may be rendered by the computing device 108 to present the placeholder file 105 to the user 110.

The user 110 may interact with the application 106, respectively, with a keyboard based input, a mouse based input, a voice based input, a pen based input, and a gesture based input, among others. The gesture based input may include one or more touch based actions such as a touch action, a swipe action, and a combination of each, among others.

While the example system in FIG. 1 has been described with specific components including the computing device 108, the filter driver 102, embodiments are not limited to these components or system configurations and can be implemented with other system configuration employing fewer or additional components.

Figure 2:
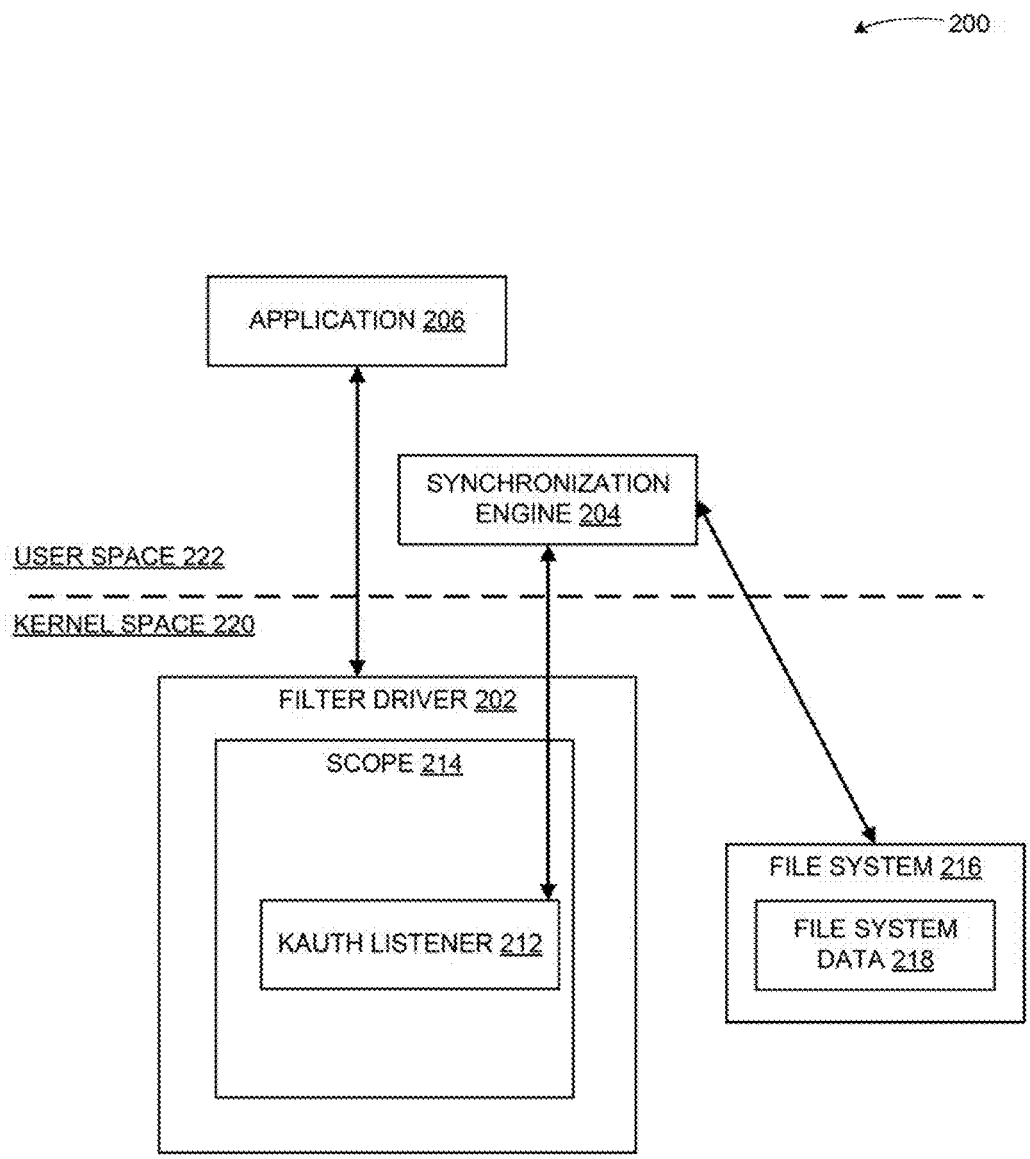
FIG. 2 is a display diagram illustrating example components of a filter driver that automatically controls file hydration behavior, according to embodiments.

FIG. 2 is a display diagram illustrating example components of a filter driver that automatically controls file hydration behavior, according to embodiments.

In a diagram 200, the filter driver 202 may be an input/output (I/O) evaluator provided by an operating system. The filter driver may deploy a listener that intercepts file operation requests) associated with a hydration operation. An example of the filter driver 202 may include a kernel authorization (KAUTH) driver that deploys a KAUTH listener 212 based on a scope 214. The scope 214 may include an area of interest for authorization or notification within a kernel space 220 of an operating system. The kernel space 220 may include an environment of the operating system in which operations associated with a kernel of the operating system are executed. The kernel may encompass core execution operations of the operating system.

In an example scenario, the filter driver 202 may receive a file operation request initiated by an application 206. The application 206 may execute in a user space 222 (of the operating system). The file operation request may seek to access a placeholder file that refers to an actual file. The placeholder file may be file access scheme commonly deployed by cloud based providers to conserve resources by providing access to an actual file through a representation (such as a pointer file, a link file, an empty file, a sample file, and/or similar ones).

The file operation request may include a read operation or a write operation. The KAUTH listener 212 may intercept the file operation request for processing. Initially, the operating system may be queried to identify a process ID (PID) and/or a process name associated with the file operation request. The PID may be matched to a PID registration associated with a synchronisation engine 204. A hydration behavior associated with the application 206 may be identified based on the synchronization engine 204 that acts as an intermediary in retrieving file system data associated with the placeholder file. For example, the PID associated with the application 206 (and/or the file operation request) may be matched to the PID registration associated with the synchronization engine 204 that services the application 206. In an alternative example, the PID may be solely used to identify the application 206 when the application 206 is the synchronization engine 204 that initiates the input/output (I/O). In an example scenario, a PID associated with an image viewer (as the application 206) may be matched to the synchronization engine 204 (when the image viewer acts as the synchronization engine 204).

The synchronization engine 204 may access the file system 216 by executing a hydration operation. The hydration operation may include operation(s) to retrieve file system data 218 associated with the placeholder file. The file system data 218 may encompass the actual file referred to by the placeholder file. Upon receiving the file system data 218 from the synchronization engine 204, the file system data 218 may be provided to the application 206 in response to the file operation request.

A decision associated with the file operation request may be rendered based on the hydration behavior. The application 206 may be matched to a hydration behavior (such as allow and/or deny, among others). The synchronization engine 204 may be authorized to proceed with the hydration operation based on the decision.

Figure 3:
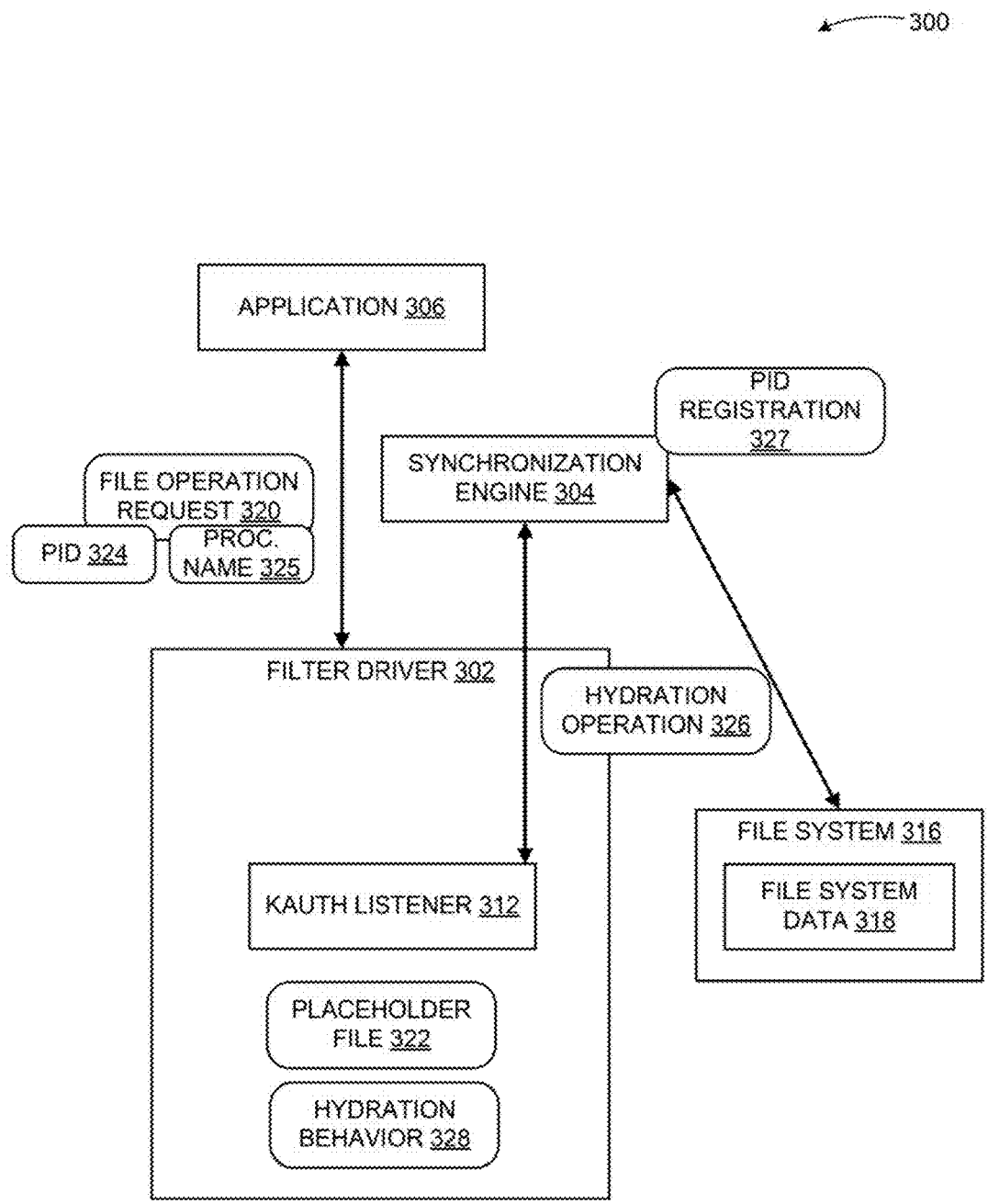
FIG. 3 is a display diagram illustrating components of a scheme to control file hydration behavior based on discovery of a calling application, according to embodiments.

FIG. 3 is a display diagram illustrating components of a scheme to control file hydration behavior, according to embodiments.

In a diagram 300, a filter driver 302 may deploy a KAUTH listener 312 to intercept a file operation request 320 received from an application 306. The file operation request 320 may include instructions to access a placeholder file 322. The KAUTH listener 312 may verify that the file operation request 320 seeks to access the placeholder file 322. If verified, the filter driver 302 may interact with a synchronization engine 304 to execute a hydration operation 326. The hydration operation 326 may include operations to access a file system 316 to retrieve a file system data 318 associated with the placeholder file 322. The file system data 318 may be provided by the filter driver 302 to the application 306 as the actual file (that is referred by the placeholder file 322). For example, a thumbnail (as an example of the placeholder file 322) may refer to an image (as an example of the actual file).

An authorization of the application 306 to access the file system data 318 may be verified based on a hydration behavior 328 granted to the application 308. The hydration behavior 328 may be identified based on a PID 324 and/or the process name 325 associated with the file request operation. The operating system may be queried to retrieve the PID 324 and the process name 325. The synchronization engine 304 may be identified as an intermediary for the file operation request 320 by matching the PID 324 to the PID registration 327 from the synchronization engine. The application 306 may be identified based on a process name 325 associated with the file operation request 320. Furthermore, the hydration behavior 328 may be matched to the application 306 based on the PID or the process name. The hydration behavior associated with the application 306 may determine whether the synchronization engine 304 is instructed to execute the hydration operation 326.

Figure 4:
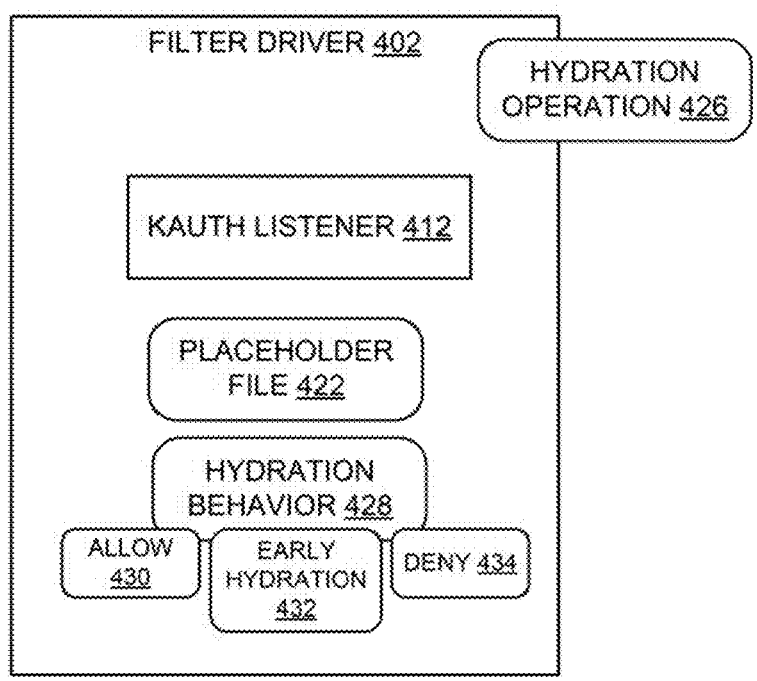
FIG. 4 is a display diagram illustrating components of a scheme to hydrate a placeholder file based on a detected behavior, according to embodiments.

FIG. 4 is a display diagram illustrating components of a scheme to hydrate a placeholder file based on a detected behavior, according to embodiments.

In a diagram 400, a KAUTH listener 412 of the filter driver 402 may match an actor associated with a PID and/or a process name to a hydration behavior. The PID and/or the process name may be used to identify an application that initiates a file operation request, if the file operation request is determined to demand access to a placeholder file, a hydration operation 426 may be executed, to retrieve file system data associated with the placeholder file. The hydration behavior associated with the application may decide whether a synchronization engine may execute the hydration operation 426. The hydration behavior 428 may include an allow 430 action, an early hydration 432 action, and a deny 434 action.

For example, the KAUTH listener may detect that the hydration behavior 428 allows the hydration operation 426. In response, a synchronization engine may be instructed to access file system data associated with the placeholder file 422 from the file system that may be hosted by a variety of file storage solutions such as a cloud-based file storage provider. The placeholder file 422 may be identified by the file operation request. Next, the placeholder file 422 may be replaced by the file system data to provide the file system data as an actual file (referred by the placeholder file 422). The file system data may be provided in response to the file operation request.

In an alternative scenario, an application (that initiates the file operation request) may be detected based on the PID and/or the process name. The application may be matched to the hydration behavior 428. The hydration behavior may be detected as granting an early hydration 432. In response, the hydration operation 426 may be executed. Furthermore, the application may be blocked (from further file operation request(s) demanding file hydration.) until detecting a completion of the hydration operation 426. As such, the application may be prevented from executing multiple hydration operation(s) to retrieve file system data associated with the placeholder file 422. The early hydration 432 may provide application compatibility when presenting an application with the placeholder file 422. An application may reject the placeholder file 422 because of a size of the placeholder file 422 may be diminished (or zero) compared to an actual file and the application may expect to retrieve the actual file with a corresponding size. The early hydration 422 operation may be executed upon a file access request to provide the application with the actual file or a hydrated file that matches the size of the actual file. A limited access such as the early hydration 432 may free resources by preventing duplicate file operation requests.

In another example scenario, the hydration behavior may be detected as a deny action 434. The deny action 434 may prevent further processing of the file operation request. As such, the filter driver 402 may instruct the synchronization engine to continue to maintain the placeholder file 422.

As discussed above, the filter driver may be employed to perform operations to control file hydration behavior. An increased resource consumption efficiency with a file system may occur as a result of automatically intercepting file operation request and routing the file operation request based on a hydration behavior entitled by an application that initiates the file operation request. A synchronisation engine may be engaged to execute a hydration operation and to replace a placeholder file with a file system data of an actual file based on the hydration behavior entitled by the application. Additionally, automatically controlling file hydration behavior, by the filter driver 102, may reduce processor load, increase processing speed, conserve memory, reduce network bandwidth usage, and/or similar ones.

Embodiments, as described herein, address a need that arises from a lack of efficiency to control file hydration behavior. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Controlling file hydration behavior may be implemented in configurations employing fewer or additional components in applications and user interlaces. For example, kernel authorization driver and listener are used herein as example components for illustration purposes. Embodiments may be implemented in any operating system using driver and listener components with similar properties and functionalities. Furthermore, the example schema and components shown in FIGS. 1 through 4 and their subcomponents may be implemented in a similar manner with other values using the principles described herein.

Figure 5:
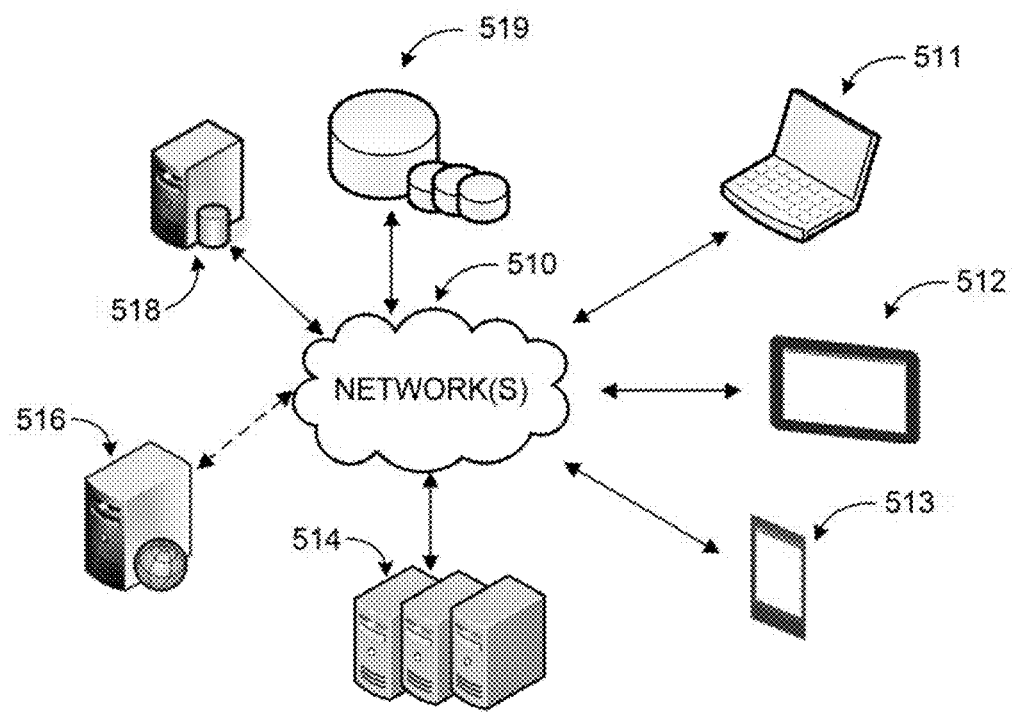
FIG. 5 is a simplified networked environment, where a system according to embodiments may be implemented.

FIG. 5 is an example networked environment, where embodiments may be implemented. A filter driver configured to control file hydration behavior may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A filter driver may receive a PID registration from a synchronization engine. Upon receiving a file operation request associated with a placeholder file, a PID and a process name associated with the file operation request may be identified. Next, a hydration behavior may be detected based on the PID and/or the process name. A decision associated with the file operation request may be rendered based on the hydration behavior. The filter driver may store data associated with the placeholder file in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to control file hydration behavior. Furthermore, the networked environments discussed in FIG. 5 are for illustration purposes only. Embodiments are not limited to the example applications, modules, or processes.

Figure 6:
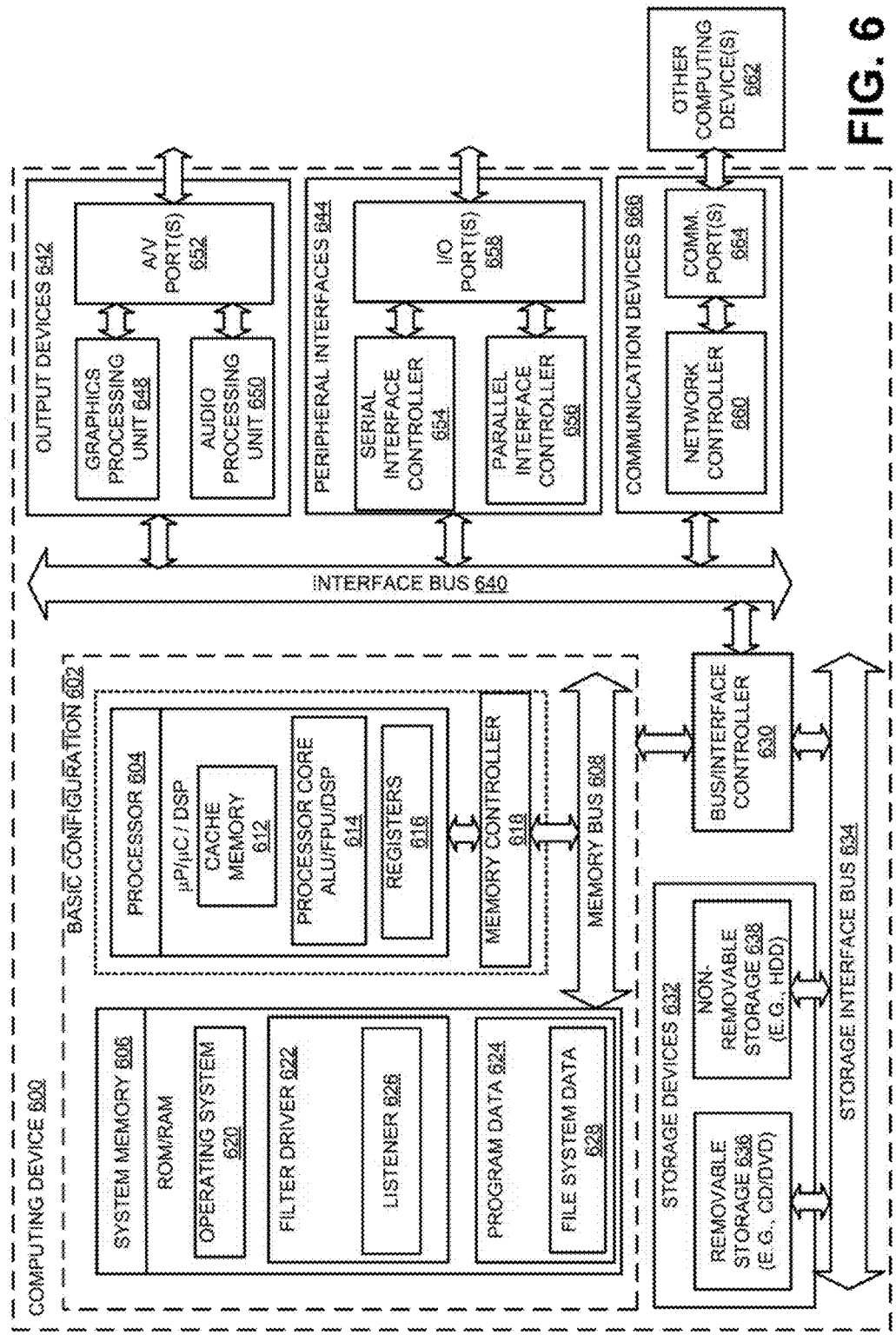
FIG. 6 is a block diagram of an example computing device, which may be used to control file hydration behavior, according to embodiments.

FIG. 6 is a block diagram of an example computing device, which may be used to control file hydration behavior, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a filter driver 622, and a program data 624. The filter driver 622 may include a component such as a listener 626. The listener 626 may execute the processes associated with the filter driver 622. The listener 626 may also intercept and guide file operation request(s) to the filter driver 622. The listener 626 may receive a PID registration from a synchronisation engine. Upon receiving a file operation request associated with a placeholder file, a PID and a process name associated with the file operation request may be identified. Next, a hydration behavior may be detected based on the PID and/or the process name. A decision associated with the file operation request may be rendered based on the hydration behavior.

Input to and output out of the productivity service 622 may be transmitted through a communication module associated with the computing device 600. An example of the communication module may include a communication device 666 that may be communicatively coupled to the computing device 600. The communication module may provide wired and/or wireless communication. The program data 624 may also include, among other data, file system data 628, or the like, as described herein. The file system data 628 may include an actual file referred by a placeholder file, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDDs), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium, which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interlace controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions. data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations. Additionally, the computing device 600 may include specialized hardware such as an application-specific integrated circuit (ASIC), a field programmable gate array (FPGA), a programmable logic device (PLD), and/or a free form logic on an integrated circuit (IC), among others.

Example embodiments may also include methods to control file hydration behavior. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
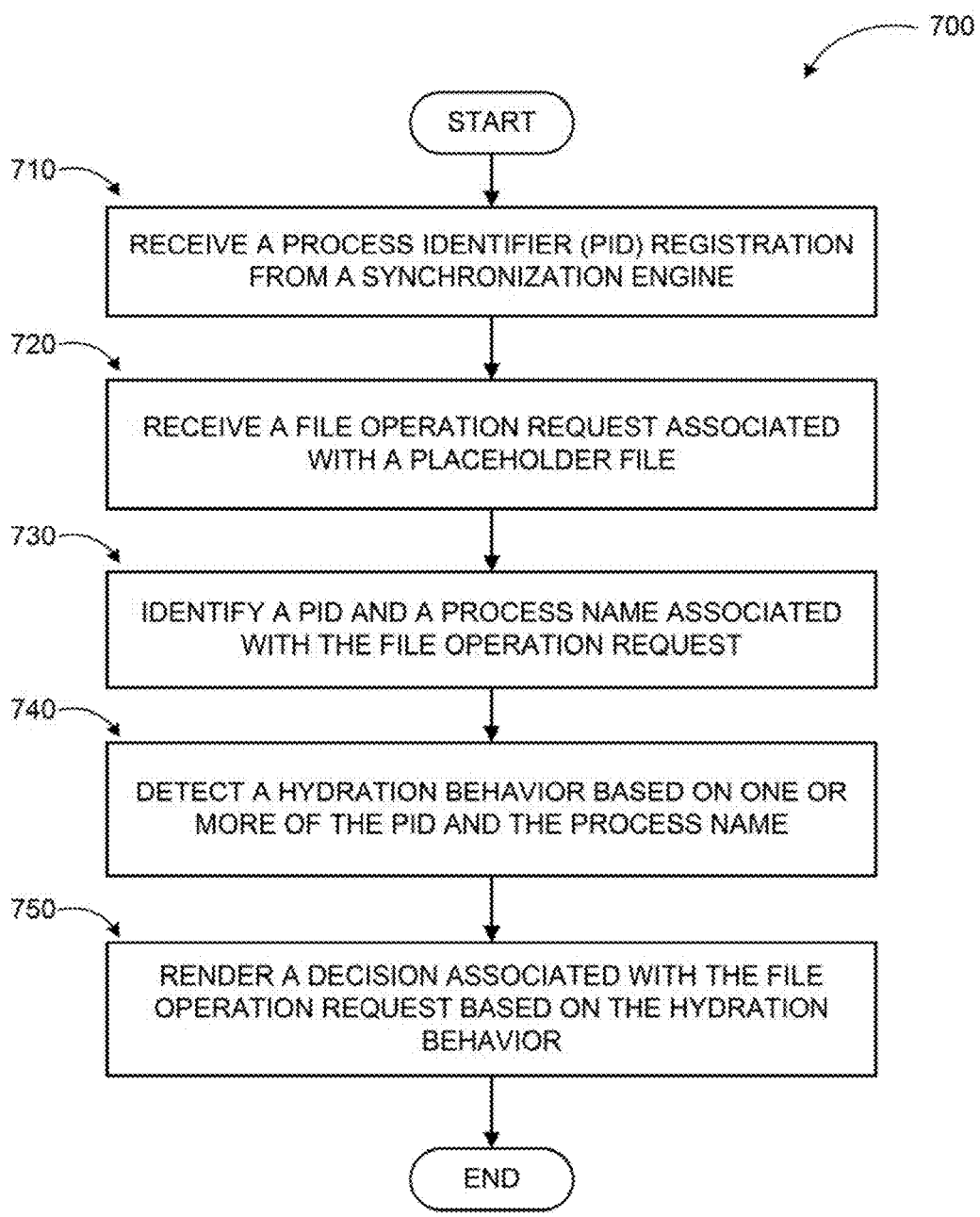
FIG. 7 is a logic flow diagram illustrating a process for controlling file hydration behavior, according to embodiments.

FIG. 7 is a logic flow diagram illustrating a process for controlling file hydration behavior, according to embodiments. Process 700 may be implemented on a computing device, such as the computing device 600 or another system.

Process 700 begins with operation 710, where the filter driver may receive a PID registration from a synchronization engine. Next, at operation 720, a file operation request associated with a placeholder file may be received. The file operation request may include a read operation or a write operation to access file system data associated with the placeholder file.

At operation 730, a PID and a process name associated with the file operation request may be identified. The PID and the process name may be requested from an operating system. The process name may identify an application that initiates the file operation request. At operation 740, a hydration behavior may be detected based on the PID and/or the process name. The application associated with the PID may be matched to a hydration behavior. A decision associated with the file operation request may be rendered based on the hydration behavior at operation 750.

The operations included in process 700 is for illustration purposes. Controlling file hydration behavior may be implemented by similar processes with fewer or additional steps, as well as in different order of operations using the principles described herein. The operations described herein may be executed by one or more processors operated on one or more computing devices, one or mare processor cores, specialized processing devices, and/or general purpose processors, among other examples.

In some examples, a computing device to control file hydration behavior is described. The computing device includes a communication module configured to facilitate exchange of information associated with a cloud based file and other data with computing devices, a memory configured to store instructions associated with a filter driver, and a processor coupled to the memory and the communication module. The filler driver includes a listener. The listener is configured to receive, through the communication module, a process identifier (PID) registration from a synchronisation engine, receive, through the communication module, a file operation request associated with a placeholder file, identify a PID and a process name associated with the file operation request, detect a hydration behavior based on one or more of the PID and the process name, and render a decision associated with the file operation request based on the hydration behavior.

In other examples, the file operation request includes a hydration operation as a precursor. The file operation request includes one or more of a read operation and a write operation. The placeholder file includes a cloud based file. The listener is further configured to process a property of the placeholder file and identify a hydration operation to fulfill the file operation request based on the property of the placeholder file. The hydration operation replaces the placeholder file with file system data for fulfilling the file operation request. The listener is further configured to retrieve the PID from an operating system executing the file operation request and identify the process name from the PID.

In further examples, the listener is further configured to identify the synchronization engine as an intermediary for the file operation request by matching the PID to the PID registration from the synchronization engine. The listener is further configured to analyze the process name to identify an application that initiates the file operation request. The listener is further configured to match an actor associated with one or more of the PID and the process name to the hydration behavior, where the hydration behavior allows a hydration operation associated with the file operation request and read file system data associated with the placeholder file identified by the file operation request. The listener is further configured to replace the placeholder file with the file system data and provide the file system data in response to the file operation request.

In some examples, a method executed on a computing device to control file hydration behavior is described. The method includes receiving a process identifier (PID) registration from a synchronisation engine, receiving a file operation request associated with a placeholder file, where the file operation request includes a hydration operation to replace the placeholder file with a file system data, identifying a PID and a process name associated with the file operation request, detecting a hydration behavior based on one or more of the PID and the process name, and rendering a decision associated with the file operation request based on the hydration behavior.

In other examples, the method further includes detecting an application based on one or more of the PID and the process name, where the application initiates the file operation request and matching the application to the hydration behavior. The method further includes detecting the hydration behavior as granting an early hydration and executing the hydration operation. The method further includes blocking the application until detecting a completion of the hydration operation. The method further includes in response to detecting the hydration behavior as denying the file operation request, maintaining the placeholder file. The method further includes intercepting the file operation request and transmitting a notification to the synchronization engine to proceed with the file operation request based on the decision, where the decision directs an execution of the hydration operation.

In some examples, a computer-readable memory device-with instructions stored thereon to control file hydration behavior is described. The instructions include actions that are similar to the actions of the method.

In some examples, a means for controlling file hydration behavior is described. The means for controlling file hydration behavior includes a means for receiving a process identifier (PID) registration from a synchronization engine, a means for receiving a file operation request associated with a placeholder file, a means for identifying a PID and a process name associated with the file operation request, a means for detect a hydration behavior based on one or more of the PID and the process name, and a means for rendering a decision associated with the file operation request based on the hydration behavior.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to control file hydration behavior, the computing device comprising:
   a memory configured to store instructions associated with a filter driver;
   a processor coupled to the memory, the processor, through executing the filter driver in conjunction with the instructions stored in the memory, is configured to:
      receive a process identifier (PID) registration from a synchronization engine;
      receive a file operation request associated with a placeholder file;
      identify a PID and a process name associated with the file operation request;
      detect an application based on one or more of the PID and the process name, wherein the application initiates the file operation request;
      detect a hydration behavior based on the PID registration and one or more of the application, the PID, and the process name; and
      render a decision associated with the file operation request based on the hydration behavior, wherein rendering the decision based on the hydration behavior includes executing a hydration operation and blocking the application from further file operation requests until detecting completion of the hydration operation in response to the hydration behavior indicating an early hydration.

2. The computing device of claim 1, wherein the file operation request includes the hydration operation as a precursor.

3. The computing device of claim 1, wherein the file operation request includes one or more of a read operation and a write operation.

4. The computing device of claim 1, wherein the placeholder file includes a cloud based file.

5. The computing device of claim 1 wherein the processor is further configured to:
   process a property of the placeholder file; and
   identify the hydration operation to fulfill the file operation request based the property of the placeholder file.

6. The computing device of claim 5, wherein the hydration operation replaces the placeholder file with file system data for fulfilling the file operation request.

7. The computing device of claim 1. wherein the processor is further configured to:
   retrieve the PID from an operating system executing the file operation request; and
   identify the process name from the PID.

8. The computing device of claim 1, wherein the processor is further configured to:
   identity the synchronization engine as an intermediary for the file operation request by matching the PID to the PID registration from the synchronization engine.

9. The computing device of claim I, wherein the processor is further configured to:
   analyze the process name to identify the application that initiates the file operation request.

10. The computing device of claim 1, wherein the processor is further configured to:
    match an actor associated with one or more of the PID and the process name to the hydration behavior, wherein the hydration behavior allows a hydration operation associated. with the file operation request; and
    read file system data associated with the placeholder file identified by the file operation request.

11. The computing device of claim 10. Wherein the processor is further configured to:
    replace the placeholder file with the file system data; and
    provide the file system data in response to the file operation request.

12. A method executed on a computing device to control file hydration behavior, the method comprising:
    receiving a process identifier (PID) registration from a synchronization engine;
    receiving a file operation request associated with a placeholder file, wherein the file operation request includes a hydration operation to replace the placeholder file with file system data;
    identifying a PID and a process name associated with the file operation request;
    detecting an application based on one or more of the PID and the process name, wherein the application initiates the file operation request;
    detecting a hydration behavior based on the PID registration and one or more of the application, the PID, and the process name; and
    rendering a decision associated with the file operation request based on the hydration behavior, wherein rendering the decision associated with the file operation request includes executing the hydration operation and blocking the application until detecting completion of the hydration operation in response to the hydration behavior indicating an early hydration.

13. The method of claim 12, wherein rendering the decision associated with the file operation request includes maintaining the placeholder file in response to the hydration behavior indicating a denial of the file operation request.

14. The method of claim 12, further comprising:
    intercepting the file operation request; and transmitting a notification to the synchronization engine to proceed with the file operation request based on the decision, wherein the decision directs an execution of the hydration operation.

15. A computer-readable memory device with instructions stored thereon to control file hydration behavior, the instructions comprising;
   receiving a process identifier (PID) registration from a synchronization engine;
   receiving a file operation request associated with a placeholder file, wherein the file operation request includes a hydration operation to replace the placeholder file with file system data;
   identifying a PID and a process name associated with the file operation request;
   detecting an application based on one or more of the PID and the process name, wherein the application initiates the file operation request;
   detecting a hydration behavior based on the PID registration and one or more of the application, the PID, and the process name; and
   rendering a decision associated with the file operation request based on the hydration behavior, wherein rendering the decision associated with the file operation request includes executing the hydration operation and blocking the application until detecting completion of the hydration operation in response to the hydration behavior indicating an early hydration.

16. The computer-readable memory device of claim 15, wherein the instructions further comprise:
   matching an actor associated with one or more of the PID and the process name to the hydration behavior, wherein the hydration behavior allows a hydration operation associated with the file operation request;
   reading file system data associated with the placeholder file identified by the file operation request;
   replacing the placeholder file with the file system data; and
   providing the file system data in response to the file operation request.

* * * * *